United States Patent
Sweenie et al.

[15] 3,657,479

[45] Apr. 18, 1972

[54] ACOUSTIC COUPLER AND PREAMPLIFIER FOR FACSIMILE MACHINES

[72] Inventors: Richard E. Sweenie, Champaign; James M. Griffith, Urbana, both of Ill.

[73] Assignee: The Magnavox Company, Fort Wayne, Ind.

[22] Filed: Nov. 13, 1970

[21] Appl. No.: 89,443

Related U.S. Application Data

[63] Continuation of Ser. No. 774,832, Nov. 26, 1968, abandoned.

[52] U.S. Cl. .......... 179/1 C

[51] Int. Cl. .......... H04m 1/00

[56] References Cited

UNITED STATES PATENTS 2,402,341 6/1946 Patterson .......... 179/1 C 3,277,243 10/1966 Fairbairn .......... 179/81

3,319,003 5/1967 Prager .......... 179/1 C 3,449,522 6/1969 Crane .......... 179/1 C

*Primary Examiner*—Ralph D. Blakeslee

*Attorney*—Richard T. Seeger

[57] ABSTRACT

In a facsimile system, an acoustic coupler is used to connect a facsimile machine through a telephone handset to a telephone line and a remote machine. When a machine is receiving, audible signals at the earpiece of the telephone handset are directed toward a microphone which is wired to the machine. The signal-to-noise ratio of received signals is improved by a preamplifier placed in the coupler as close as possible to the microphone. The preamplifier amplifies the microphone signals before they are subjected to noise or other interference in the wires leading to the receiving machine.

5 Claims, 4 Drawing Figures

INVENTORS
RICHARD E. SWEENIE
JAMES M. GRIFFITH

BY Jeffers and Young
ATTORNEYS

Patented April 18, 1972 3,657,479

3 Sheets-Sheet 2

INVENTORS
RICHARD E. SWEENIE
JAMES M. GRIFFITH

BY Jeffers and Young
ATTORNEYS

INVENTORS
RICHARD E. SWEENIE
JAMES M. GRIFFITH

BY Jeffers and Young
ATTORNEYS

ACOUSTIC COUPLER AND PREAMPLIFIER FOR FACSIMILE MACHINES

This application is a continuation of application Ser. No. 774,832, filed Nov. 26, 1968, now abandoned.

BACKGROUND OF THE INVENTION

Our invention relates to an improved acoustic coupler for facsimile machines, and particularly to such an acoustic coupler that provides an improved signal-to-noise ratio when facsimile machines are used to receive.

Facsimile systems are used in business, industry, and other activities to scan a paper or document at one location and transmit electrical signals to a remote location where the scanned paper or document is reproduced. These facsimile systems are designed to be used with an ordinary telephone handset. A person who wants to send or receive a document by facsimile can use his telephone to call the desired distant person. After the call is established, the persons at both ends connect their facsimile machines to their telephone handsets through respective acoustic couplers. Each acoustic coupler provides a two-way acoustic or audible link or coupling between a facsimile machine and a telephone handset, so that permanent or wired connections do not have to be made between the facsimile machine and the telephone lines. Such an acoustic coupler makes the facsimile machine much more useful and versatile, since the machine can be carried from one location to another and easily connected by an acoustic coupler to a telephone handset which in turn may be connected to any other telephone at any other location. When a facsimile machine is used to transmit through an acoustic coupler, good signals are provided because a relatively high level audio sound is applied by the acoustic coupler to the telephone mouthpiece. However, when the facsimile machine is used to receive through an acoustic coupler, the only available audio sound is that supplied by the telephone earpiece. This audio sound must be directed to a microphone in the acoustic coupler, and is subject to extraneous sounds and noises. Further, the electrical signal produced by the microphone is at a relatively low level, typically in the order of 50 microvolts, so that this electrical signal is also subject to noise and interference. If the acoustic coupler and facsimile machine are at a location where there are relatively high level electrical signals, such as produced by electric motors or computing apparatus, these high level electrical signals are coupled into the cable between the acoustic coupler and the facsimile machine in the form of undesired noise. We have found that in some installations or locations, the signal level produced by the microphone in an acoustic coupler is so low and the extraneous electrical signals are so high that the signal-to-noise ratio is very poor. This very poor signal-to-noise ratio results in a reproduced document that either does not convey the desired intelligence or information, or does not convey the desired intelligence or information with the necessary clarity. The noise signals present along with the desired microphone signal may cause marks or other background indications on the document reproduced, so that the document is of very poor quality.

Accordingly, an object of our invention is to provide an improved acoustic coupler which can be used with a telephone handset and a facsimile machine to provide better documents when the facsimile machine is used to receive.

Another object of our invention is to provide an improved acoustic coupler having the advantages of versatility, and at the same time having a relatively good signal-to-noise ratio when the acoustic coupler is used for receiving.

Still another object of our invention is to provide an improved facsimile acoustic coupler having a receiving preamplifier which amplifies the microphone signals produced by received audible signals, so that a good quality of document can be produced by the facsimile machine.

SUMMARY OF THE INVENTION

Briefly, these and other objects are achieved in accordance with our invention by an acoustic coupler having a microphone for receiving audible signals and producing electrical signals, and having a loud-speaker for receiving electrical signals and producing audible signals. A preamplifier, preferably having a transistor, is mounted directly in the acoustic coupler as near the microphone as possible, so that the leads between the microphone output and the preamplifier input may be as short as possible. The electrical signals from the microphone are thus amplified before appreciable interference or noise signals are mixed in with the microphone signals. The preamplifier output is coupled to the facsimile machine input by leads in a cable which may also have other leads connecting the facsimile machine output to the acoustic coupler loud-speaker. This cable may be relatively long, but the signal-to-noise ratio for the electrical signals from the microphone will still be relatively good since the electrical signals from the microphone were amplified at the acoustic coupler. For a given location, we have found that an acoustic coupler with such a preamplifier for the microphone provides relatively better documents when a facsimile machine is used to receive.

BRIEF DESCRIPTION OF THE DRAWING

The subject matter which we regard as our invention is particularly pointed out and distinctly claimed in the claims. The structure and operation of our invention, together with further objects and advantages, may be better understood from the following description given in connection with the accompanying drawing, in which:

DESCRIPTION OF THE PREFERRED EMBODIMENT

Figure 1:
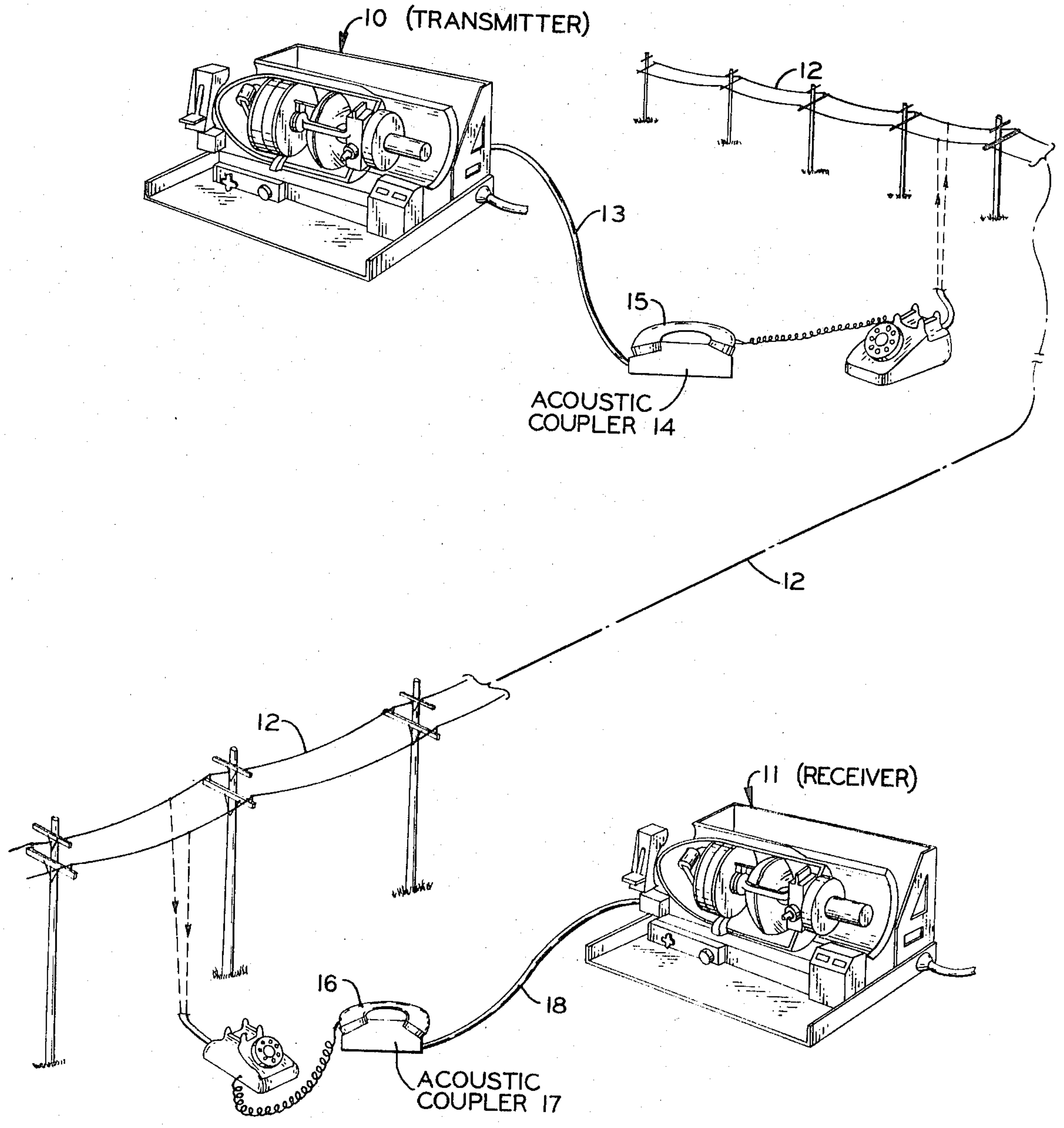
FIG. 1 is a diagrammatic perspective view of a facsimile system which utilizes acoustic couplers in accordance with our invention.

In FIG. 1, we have shown a facsimile system having two facsimile machines 10, 11 connected over a telephone system 12. Usually, both facsimile machines 10, 11 are arranged so that either machine can be used to transmit or receive. In FIG. 1, we have assumed that the facsimile machine 10 is used as a transmitter for scanning a document which is to be reproduced by the facsimile machine 11, so that the facsimile machine 11 is used as a receiver. The facsimile machines 10, 11 are known in the art, so they will be only briefly described. When used as a transmitter, the facsimile machine 10 scans a document, such as with a moving spot of light, and uses a light sensitive device for producing electrical signals indicative of the specific area on the document being scanned. These electrical signals may take various forms, although frequency modulated signals are typical. The transmitting facsimile machine 10 converts the electrical signals into frequency modulated signals having an audio frequency indicating the relative lightness or darkness of the document area being scanned. These frequency modulated signals are connected by a cable 13 to an acoustic coupler 14 having a loud-speaker or similar acoustic transducer which converts the electrical signals into audible signals. The audible signals are directed toward the mouthpiece of an ordinary telephone handset 15. The telephone handset 15 is connected through the remainder of the telephone to the telephone system 12. By previous local or long-distance connections, a person at the transmitting machine 10 can have established a connection with a telephone handset 16 at the location of the receiving machine 11. While we have shown the telephone system 12 as comprising simple open wire, it is to be understood that the telephone system 12 may utilize any conventional telephone facilities, such as cable, cable carrier, or radio carrier. The telephone at the receiving machine location has its handset 16 connected by an acoustic coupler 17 and a cable 18 to the receiving machine 11. When the acoustic coupler 17 is used in the receiving mode, the audible signals produced by the earpiece of the telephone handset 16 are directed toward a microphone in the acoustic coupler 17. The microphone in the acoustic coupler 17 converts these audible signals into electrical signals which are carried by a cable 18 to the receiving machine 11. The receiving machine 11 has appropriate electrical apparatus for converting the electrical signals into mechanical functions which mark or produce marks on a document. If the receiving machine 11 is properly synchronized with the transmitting machine 10, the document produced by the receiving machine 11 will be a fairly faithful and complete reproduction of the document scanned in the transmitting machine 10. From this description, it will be seen that the acoustic couplers 14, 17 make the facsimile machines 10, 11 more flexible or versatile. The facsimile machines 10, 11 do not have to be permanently wired to a telephone line, so that the machines 10, 11 can be used with any ordinary telephone handset at any location, and so that the telephone handset and its line can be used for conversation when desired.

Figure 2:
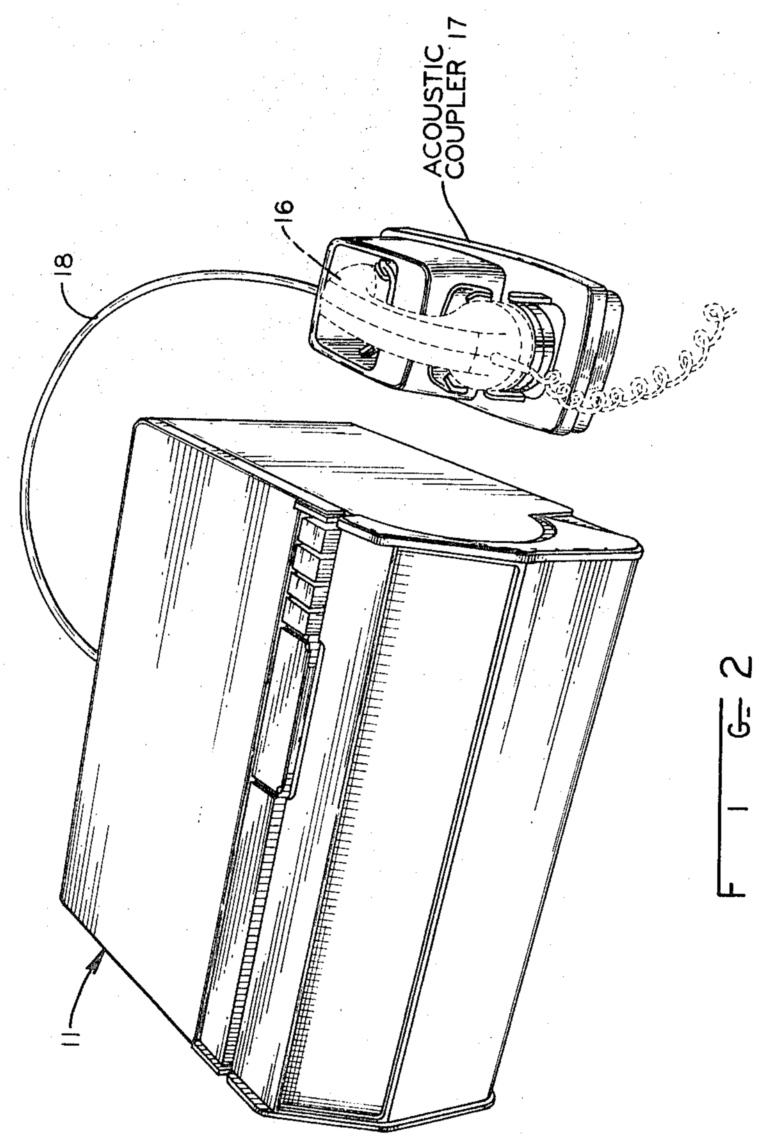
FIG. 2 shows an enlarged perspective view of a facsimile machine, an acoustic coupler, and a telephone handset used in the facsimile system of FIG. 1.

FIG. 2 shows an enlarged perspective view of the receiving machine 11 connected to its acoustic coupler 17 by the cable 18, and the telephone handset 16 (shown in dashed lines) positioned on the acoustic coupler 17. When the telephone handset 16 is used for receiving, the audible signals produced by the earpiece are subject to some interference from extraneous audible sounds or noises. For this reason, the telephone earpiece is preferably positioned in a structure, such as the walled arrangement shown in FIG. 2, for blocking as many of these extraneous noises as possible. This improves the operation to some extent. However, we have found that the length of the cable 18 connecting the acoustic coupler 17 to the receiving machine 11 subjects the electrical signals produced by the microphone in the coupler 17 to electrical noise and interference. This is particularly true where the acoustic coupler 17 and the receiving machine 11 are used in locations having motors, computers, or other electrical devices. Such devices are relatively common, particularly where a receiving machine 11 is provided.

Figure 3:
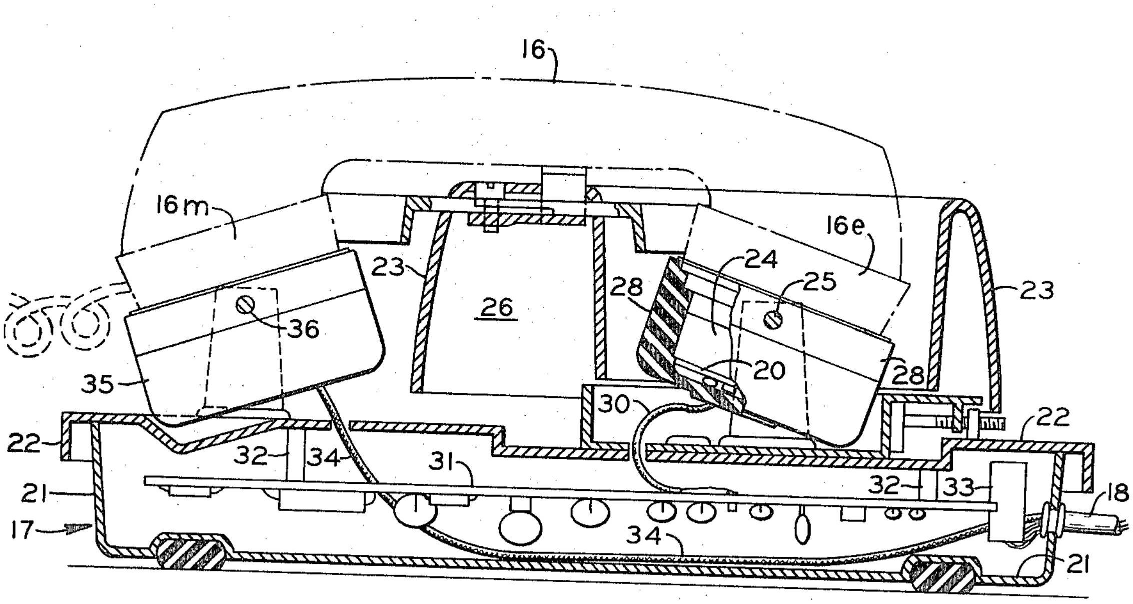
FIG. 3 shows a cross-sectional view of an acoustic coupler in accordance with our invention for preamplifying the electrical signals produced by the microphone in the acoustic coupler.

FIG. 3 shows the acoustic coupler 17 provided with a preamplifier 20 in accordance with our invention for improving the signal-to-noise ratio when the acoustic coupler 17 is used with a receiving machine such as the machine 11 in FIGS. 1 and 2. With reference to FIG. 3, the acoustic coupler 17 comprises a base 21, a top 22 positioned on the base 21, and a sound-shielding wall structure 23 positioned on the top 22. The wall structure 23 may hold switches and other electrical apparatus indicated by the reference numeral 26. A microphone 24 is positioned within the wall structure 23, preferably on pivots 25, so that the microphone 24 can be positioned as closely as possible to the earpiece 16e of the telephone handset 16. The wall structure 23 and the microphone 24 may also be moved along the top 22 to permit the microphone 24 to be adjusted for different sizes of telephone handsets. The microphone 24 is preferably encased around its sides and bottom in a suitable resilient material 28 (shown partially in section) to protect and cushion the microphone 24. The preamplifier 20 is preferably in the form of a printed circuit board which is of the proper shape and which is small enough to fit beneath the microphone 24 at the bottom of the material 28, so as to be as close as possible to the microphone 24. Thus, the leads from the microphone 24 to the preamplifier 20 are as short as possible, and reduce the possibility of noise or interference signals being coupled to the microphone signals. The output of the preamplifier 20 is coupled by a set of leads 30 to a second printed circuit board 31. This printed circuit board 31 is fastened to the base 21 by suitable supports or pillars 32, and may include a second amplifier, telephone line equalizers, a filter, and a limiter if desired. The printed circuit board 31 is connected to a printed circuit board connector 33. The connector 33 provides connections between the cable 18 and the printed circuit board 31, and also provides a connection over suitable leads 34 to a loud-speaker 35. The loud-speaker 35 permits the facsimile machine 10 to transmit. The loud-speaker 35 is also positioned on the top 22, preferably on pivots 36, so that the mouthpiece 16*m* of the handset 16 can be positioned as closely as possible to the loud-speaker 35. By positioning the preamplifier 20 directly in the acoustic coupler 17 and as close to the microphone 24 as possible, we have found that the ratio of microphone signals to extraneous noise is greatly improved, and thus provides improved reproduced documents. Electrical signals and noise around the facsimile receiving machine do not have the detrimental effect that they would if the signals from the microphone 24 were connected directly into the cable 18. As mentioned earlier, these microphone signals may be in the order of 50 microvolts or less, and are highly susceptible to noise over the length of the cable 18. However, by means of our preamplifier 20, the signal level is greatly increased so that the microphone signals are not as susceptible to extraneous noise.

Figure 4:
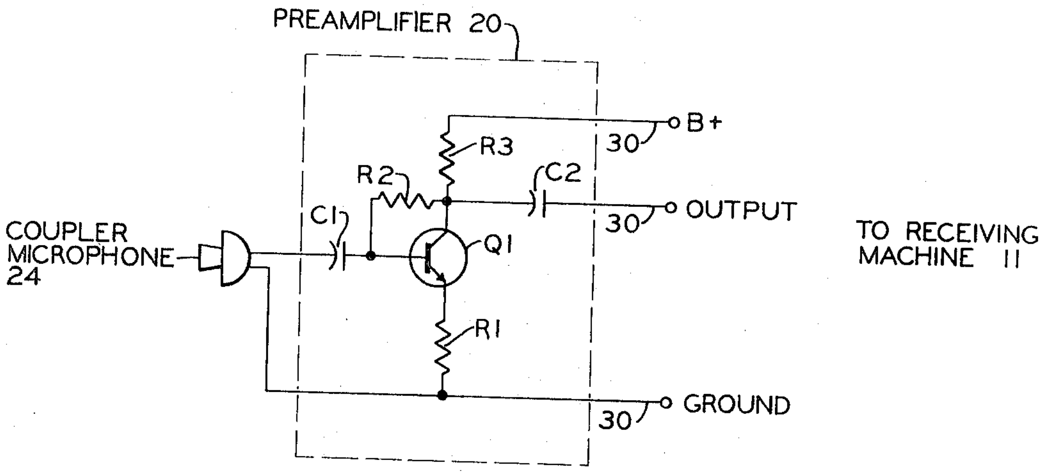
FIG. 4 shows a schematic diagram of a preferred preamplifier for use in our invention.

FIG. 4 shows a schematic diagram of a preferred embodiment of the circuit for the preamplifier 20. The preamplifier 20 comprises an NPN type transistor Q1 having its base electrode connected to the microphone 24 through a capacitor C1. The emitter of the transistor Q1 is connected through a resistor R1 to a ground lead. Current feedback is provided by a resistor R2 connected between the collector and base of the transistor Q1. The collector of the transistor Q1 is connected through a resistor R3 to a suitable source of positive direct current voltage B+. The output for the preamplifier 20 may be derived from the collector of the transistor Q1 through a capacitor C2. The three leads 30 are connected to the printed circuit board 31 or to the cable 18 for connection to the receiving machine 11 and the indicated B+, output, and ground connections.

The preamplifier 20 has been built and tested with an automatic electric Model 810 microphone being used for the coupler microphone 24. The preamplifier 20 was constructed on a circular printed circuit board mounted directly beneath the microphone 24 at the bottom of the material 28 as shown in FIG. 3. The preamplifier 20 had a circuit voltage gain in the order of 30 with the following components:

| | |
|---|---|
| Transistor Q1 | Type 2N2484 |
| Capacitor C1 | 4.7 Microfarads |
| Capacitor C2 | 4.7 Microfarads |
| Resistor R1 | 10 Ohms |
| Resistor R2 | 820,000 Ohms |
| Resistor R3 | 1,800 Ohms |
| B+ | 18 volts |

This arrangement provided a much better signal-to-noise ratio, with a corresponding improved document.

It will thus be seen that our acoustic coupler with a preamplifier provides improved operation for facsimile machines used with acoustic couplers in the receiving mode. In many instances, our preamplifier provides signals which are useful or usable in conditions and environments where the signals would otherwise result in copy that is useless, or at best of poor quality. While we have shown only one embodiment of our invention, it is to be understood that modifications may be made. For example, the preamplifier 20 may take various forms, and may be positioned in the base structure 21 of the acoustic coupler 17 if the leads between the microphone 24 and the preamplifier 20 are sufficiently short. Various leads shown in FIG. 3 may be shielded. Therefore, while the invention has been described with reference to a particular embodiment, it is to be understood that modifications may be made without departing from the spirit of the invention or from the scope of the claims.

We claim:

1. In a facsimile system having a machine for receiving electrical signals and converting the signals into information on a sheet of paper, improved couplers for connecting the machine to a remote machine by way of standard telephone lines through two telephone handsets each having a mouthpiece and an earpiece, each said coupler comprising:

a. a base;
b. an acoustic microphone mounted on said base;
c. an acoustic loud-speaker mounted on said base;
d. said acoustic microphone and said acoustic loud-speaker being positioned so that a telephone handset can be rested thereon with the mouthpiece of the telephone handset being adjacent to said acoustic loud-speaker for transmitting acoustic signals into the mouthpiece of the telephone handset, and with the earpiece of the telephone handset being adjacent said acoustic microphone for receiving acoustic signals from said earpiece of the telephone handset;
e. said base comprising a wall upstanding about said earpiece to shield the earpiece and acoustic microphone from extraneous sounds;
f. annular resilient cushion elements carried by said acoustic loud-speaker and said acoustic microphone for engagement with said telephone handset and confining the columns of air standing between the acoustic loud-speaker and acoustic microphone on the one hand and the mouthpiece and earpiece respectively of the telephone handset on the other hand;
g. a preamplifier having an input and an output;
h. means connecting said preamplifier input to said microphone;
i. a common support means on said base supporting said acoustic microphone and supporting said preamplifier immediately adjacent said acoustic microphone;
j. means connected to said preamplifier output for connection to a facsimile machine whereby said preamplifier improves the signal-to-noise ratio of the signal;
k. and means connected to said acoustic loud-speaker for connection to a facsimile machine.

2. The improved coupler of claim 1 wherein said preamplifier is an integral package fixed directly to said acoustic microphone and having leads for supplying electrical power thereto and having leads for deriving electrical signals therefrom.

3. The improved coupler of claim 1 in which said support means on said base pivotally supports said acoustic microphone and said preamplifier.

4. The improved coupler of claim 3 in which said support means is adjustable on said base in a direction toward and away from said acoustic loud-speaker.

5. The improved coupler of claim 4 wherein said preamplifier comprises a single stage transistor amplifier.

* * * * *